US009731984B2

(12) United States Patent
Beall

(10) Patent No.: US 9,731,984 B2
(45) Date of Patent: Aug. 15, 2017

(54) REVERSE OSMOSIS SYSTEMS WITH BUILT IN PRESSURE REGULATION

(71) Applicant: Next-RO, Inc., Redondo Beach, CA (US)

(72) Inventor: Timothy Allen Beall, Redondo Beach, CA (US)

(73) Assignee: Topper Manufacturing Corporation, Torrance, CA (US)

( * ) Notice: Subject to any disclaimer, the term of this patent is extended or adjusted under 35 U.S.C. 154(b) by 203 days.

(21) Appl. No.: 14/462,378

(22) Filed: Aug. 18, 2014

(65) Prior Publication Data

US 2015/0336814 A1 Nov. 26, 2015

Related U.S. Application Data

(63) Continuation of application No. 13/030,808, filed on Feb. 18, 2011, now abandoned.

(60) Provisional application No. 61/306,429, filed on Feb. 19, 2010.

(51) Int. Cl.
*B01D 61/12* (2006.01)
*C02F 1/44* (2006.01)
*B01D 61/08* (2006.01)
*B01D 65/08* (2006.01)
*C02F 1/00* (2006.01)

(52) U.S. Cl.
CPC .............. *C02F 1/441* (2013.01); *B01D 61/08* (2013.01); *B01D 61/12* (2013.01); *B01D 65/08* (2013.01); *B01D 2311/14* (2013.01); *B01D 2313/20* (2013.01); *C02F 1/003* (2013.01); *C02F 2201/004* (2013.01); *C02F 2209/03* (2013.01)

(58) Field of Classification Search
None
See application file for complete search history.

(56) References Cited

U.S. PATENT DOCUMENTS

| 2,299,611 A | 10/1942 | Clark |
| 2,343,320 A | 3/1944 | Parker |
| 2,349,321 A | 5/1944 | White |
| 2,349,322 A | 5/1944 | White |
| 2,360,590 A | 10/1944 | Schweller |
| 2,380,866 A | 7/1945 | Overbeke |
| 2,387,598 A | 10/1945 | Mercier |
| 2,389,791 A | 11/1945 | Lippincott |

(Continued)

FOREIGN PATENT DOCUMENTS

| DE | 3642882 A1 | 6/1988 |
| DE | 3706705 | 9/1988 |

(Continued)

*Primary Examiner* — Krishnan S Menon
(74) *Attorney, Agent, or Firm* — Blakely Sokoloff Taylor & Zafman LLP

(57) ABSTRACT

Systems for counter top and under the counter use having a self contained reverse osmosis filter system having a manifold assemble under which parts of the self contained reverse osmosis filter system are attached, and a raw water pressure regulator also attached under the manifold assembly, the raw water pressure regulator having an inlet for coupling to a source of raw water and an outlet coupled to the inlet for the self contained reverse osmosis filter system, whereby the ratio of product water to waste water may be maximized under normal operating conditions without clogging the self contained reverse osmosis filter system if the pressure of the source of raw water is high.

12 Claims, 1 Drawing Sheet side view

(56) References Cited

U.S. PATENT DOCUMENTS

| | | | |
|---|---|---|---|
| 2,389,792 A | 11/1945 | Lippincott |
| 2,390,319 A | 12/1945 | Overbeke |
| 2,394,401 A | 2/1946 | Overbeke |
| 2,397,248 A | 3/1946 | De Kiss |
| 2,991,885 A | 7/1961 | Gutkowski |
| 3,232,318 A | 2/1966 | Mercier |
| 3,365,061 A | 1/1968 | Bray |
| 3,406,722 A | 10/1968 | Ruth |
| 3,493,496 A | 2/1970 | Bray et al. |
| 3,504,796 A | 4/1970 | Bray |
| 3,506,037 A | 4/1970 | Hanson et al. |
| 3,520,437 A | 7/1970 | Fleming et al. |
| 3,720,235 A | 3/1973 | Schrock |
| 3,760,951 A | 9/1973 | Mansfield |
| 3,844,744 A | 10/1974 | Hausberg et al. |
| 4,176,063 A | 11/1979 | Tyler |
| 4,299,254 A | 11/1981 | Zahid |
| D273,976 S | 5/1984 | Burrows |
| D273,977 S | 5/1984 | Burrows |
| D274,452 S | 6/1984 | Burrows |
| 4,482,456 A | 11/1984 | Grayson |
| 4,552,656 A | 11/1985 | Solomon |
| 4,585,554 A | 4/1986 | Burrows |
| 4,595,497 A | 6/1986 | Burrows |
| 4,657,674 A | 4/1987 | Burrows |
| 4,705,625 A | 11/1987 | Hart, Jr. |
| 4,743,366 A | 5/1988 | Burrows |
| 4,775,465 A | 10/1988 | Burrows |
| 4,776,952 A | 10/1988 | Burrows |
| 4,784,181 A | 11/1988 | Hilverdink |
| 4,830,744 A | 5/1989 | Burrows |
| 4,834,873 A | 5/1989 | Burrows |
| 4,853,117 A | 8/1989 | Burrows |
| 4,859,320 A | 8/1989 | Beall, Jr. |
| 4,880,534 A | 11/1989 | Burrows |
| 4,895,654 A | 1/1990 | Burrows |
| 4,971,689 A | 11/1990 | Burrows |
| 4,990,248 A | 2/1991 | Brown et al. |
| 4,992,170 A | 2/1991 | Menon et al. |
| 5,002,664 A | 3/1991 | Clack et al. |
| 5,037,547 A | 8/1991 | Burrows |
| 5,045,197 A | 9/1991 | Burrows |
| 5,078,864 A | 1/1992 | Whittier |
| 5,096,574 A | 3/1992 | Birdsong et al. |
| 5,114,572 A | 5/1992 | Hunter et al. |
| 5,122,265 A | 6/1992 | Mora et al. |
| 5,128,035 A | 7/1992 | Clack et al. |
| 5,132,017 A | 7/1992 | Birdsong et al. |
| 5,143,601 A | 9/1992 | Slovak et al. |
| 5,192,004 A | 3/1993 | Burrows |
| 5,221,473 A | 6/1993 | Burrows |
| 5,246,141 A | 9/1993 | Burrows |
| 5,254,243 A | 10/1993 | Carr et al. |
| 5,289,951 A | 3/1994 | Burrows |
| 5,297,700 A | 3/1994 | Burrows et al. |
| 5,307,958 A | 5/1994 | Burrows |
| 5,310,088 A | 5/1994 | Burrows |
| 5,370,276 A | 12/1994 | Burrows |
| 5,389,260 A | 2/1995 | Hemp et al. |
| 5,390,826 A | 2/1995 | Burrows |
| 5,435,909 A | 7/1995 | Burrows |
| 5,449,093 A | 9/1995 | Burrows |
| 5,527,450 A | 6/1996 | Burrows |
| 5,580,444 A | 12/1996 | Burrows |
| 5,597,487 A | 1/1997 | Vogel et al. |
| 5,672,272 A | 9/1997 | Baer |
| 5,766,453 A | 6/1998 | Morellato et al. |
| 5,906,225 A | 5/1999 | Stark et al. |
| 5,976,363 A | 11/1999 | Monroe et al. |
| 6,076,557 A | 6/2000 | Carney |
| 6,099,735 A | 8/2000 | Kelada |
| 6,110,360 A | 8/2000 | Hart, Jr. |
| 6,290,856 B1 | 9/2001 | Beall |
| 6,764,595 B1 | 7/2004 | Halemba et al. |
| 6,814,876 B1 | 11/2004 | Neal |
| 7,070,695 B2 | 7/2006 | Husain et al. |
| 7,601,256 B2 | 10/2009 | Beall |
| 2004/0104157 A1 | 6/2004 | Beeman et al. |
| 2004/0173624 A1 | 9/2004 | Carter |
| 2005/0139530 A1 | 6/2005 | Heiss |
| 2005/0167352 A1 | 8/2005 | Burrows et al. |
| 2006/0000839 A1 | 1/2006 | Gremour et al. |
| 2006/0113240 A1 | 6/2006 | Burrows et al. |
| 2007/0045165 A1 | 3/2007 | Beall |

FOREIGN PATENT DOCUMENTS

| | | |
|---|---|---|
| DE | 4444350 A1 | 6/1996 |
| GB | 2264684 A | 9/1993 |
| JP | 64-30901 | 2/1989 |
| JP | 04-227098 | 8/1992 |
| JP | 06-099171 | 4/1994 |
| JP | 06-154738 | 6/1994 |
| JP | 09-264436 | 10/1997 |
| JP | 2003-053335 | 2/2003 |
| JP | 2003-071436 | 3/2003 |
| JP | 2004-505757 | 2/2004 |
| SU | 386156 | 6/1973 |
| SU | 1089305 | 4/1984 |
| WO | WO-02/12124 | 2/2002 | side view    rear view bottom view (tank removed)

DETAIL A
SCALE 1 : 1

REVERSE OSMOSIS SYSTEMS WITH BUILT IN PRESSURE REGULATION

CROSS-REFERENCE TO RELATED APPLICATIONS

This application is a continuation of U.S. patent application Ser. No. 13/030,808 filed Feb. 18, 2011 which claims the benefit of U.S. Provisional Patent Application No. 61/306,429 filed Feb. 19, 2010.

BACKGROUND OF THE INVENTION

1. Field of the Invention

The present invention relates to the field of reverse osmosis water filtration systems.

2. Prior Art

U.S. Pat. No. 7,601,256, the disclosure of which is hereby incorporated by reference, discloses reverse osmosis filtration systems which are fully self-contained, highly efficient and aesthetically pleasing, and can be used for either countertop installation or under the counter installation. Still further, such systems may be used as an over the counter installation and later easily converted for an under the counter installation. A highly favorable ratio of product water to waste water is obtained in such systems, in part by using raw water that passes over the reverse osmosis membrane as squeeze water, providing a cleansing flow over the membrane every time product water is dispensed by squeeze water flow over the membrane and into the squeeze water side of the storage tank.

However, if the ratio of product water to waste water is maximized under normal operating conditions (normal waterline pressures), then for higher waterline pressures, the ratio of product water to waste water will further increase, which can lead to clogging and a relatively short useful life of the reverse osmosis membrane.

DETAILED DESCRIPTION OF THE PREFERRED EMBODIMENTS

Figures 1, 2:
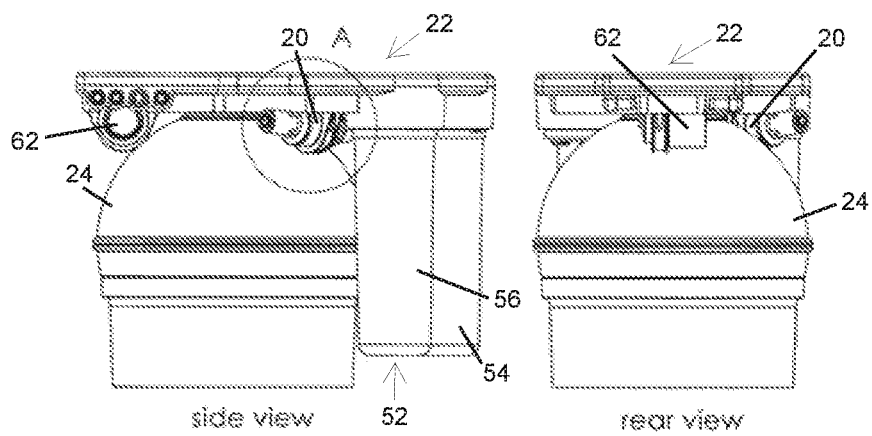
FIG. 1 is a side view of a self contained reverse osmosis water filtration system incorporating the present invention.
FIG. 2 is rear view of the reverse osmosis water filtration system of FIG. 1.
Figure 3:
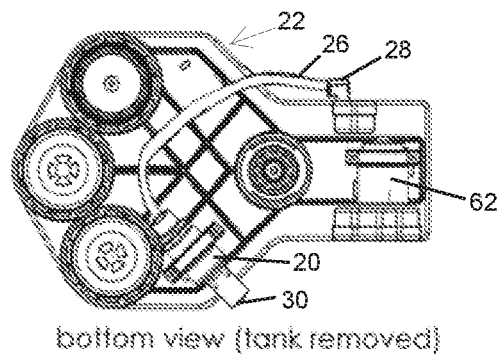
FIG. 3 is a bottom view of the manifold assembly of the reverse osmosis water filtration system of FIG. 1.
Figure 4:
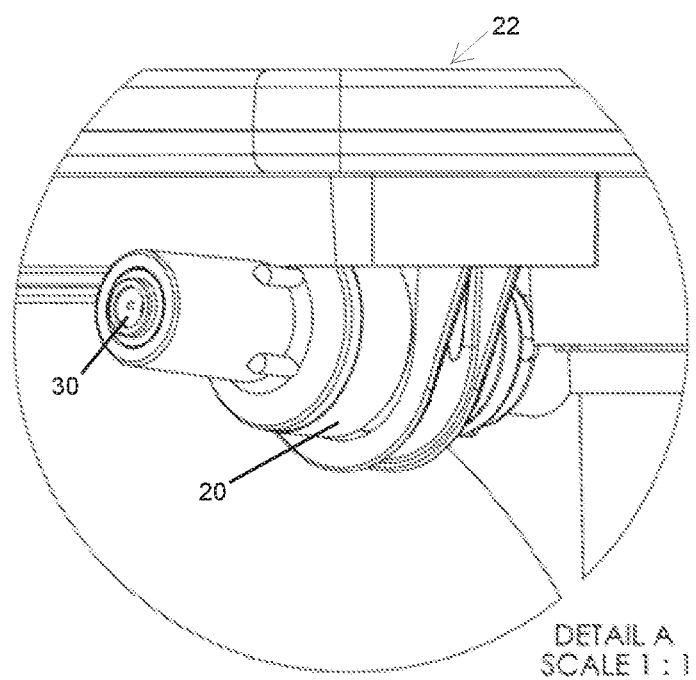
FIG. 4 is a view of the pressure regulator as mounted under the manifold assembly of the reverse osmosis water filtration system of FIG. 1, taken on an expanded scale.

To avoid the problem described in the prior art section above, the present invention includes a pressure regulator 20, shown in FIGS. 1, 2, 3 and 4. Here, as may be seen on the Figures, the pressure regulator is mounted to and under the manifold assembly 22, spaced away from the axis of the storage tank 24 so as to not interfere with the tank. Also mounted to and under the manifold assembly 22 are three cartridges, cartridges 52, 54 and 56 that contain a conventional filter, a reverse osmosis filtration membrane and an activated charcoal filter and a control valve hydraulically controlling the operation of the reverse osmosis filtration system, respectively, cartridge 52 being behind and blocked from view by cartridge 56. In the embodiment shown, the output of the pressure regulator 20 is coupled through line 26 to an elbow 28, which in turn is coupled to the raw water inlet on the manifold assembly 22. This makes port 30 the new raw water inlet for the system. Obviously, of course, rather than plugging elbow 28 into what had been the raw water inlet to the system, that raw water inlet might be plugged and the manifold assembly tapped at an appropriate place for connection of line 26 so that line 26 and elbow 28 do not extend beyond the side of the manifold assembly, but rather are located entirely below the assembly.

In one embodiment, the regulator used is a model FMP60 manufactured by Apex Valves Limited, a New Zealand company, though other regulators of appropriate size and capacity may be used as desired.

The use of the pressure regulator not only avoids contamination of the reverse osmosis membrane by avoiding over production rates, but further reduces the pressure requirement on all pressure vessels in the system downstream thereof. This is particularly advantageous with respect to the design and manufacture of the storage tank 24 by reducing its burst pressure requirements. Thus inclusion of a pressure regulator as part of the system to regulate the pressure at a maximum of, for example, 75-85 psi allows the product water to waste water ratio to be maximized for normal operating conditions without risking premature failure of the reverse osmosis membrane in those fewer installations where pressures as high as 125 psi could be encountered. The advantage of the integration of the pressure regulator into the system design in comparison to simply using a separate inline pressure regulator is the fact that one of the features of the reverse osmosis system of the foregoing patent is its ability to be used essentially interchangeably as an above counter and under counter device and the use of a separate inline regulator when using the system above counter would be unsightly and a sales deterrent, yet operation without the pressure regulator is disadvantageous.

While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A reverse osmosis filtration system for counter top and under the counter use comprising, as a single self-contained assembly:
   a manifold assembly with a lower side to which parts of the reverse osmosis filter system are attached and supported, including a product water storage tank, cartridges that contain a conventional filter, a reverse osmosis filtration membrane, an activated charcoal filter and a control valve hydraulically controlling the operation of the reverse osmosis filtration system; and
   a raw water pressure regulator contained within the self-contained reverse osmosis filter system and coupled to the lower side of the manifold assembly, the raw water pressure regulator having a raw water inlet for coupling to a source of raw water and a pressure regulated outlet coupled to the manifold assembly;
   the raw water pressure regulator operating independently of the control valve.

2. The reverse osmosis filtration system of claim 1, wherein the raw water pressure regulator is set to a second pressure that maximizes the ratio of product water to waste water under normal operating conditions without clogging the self-contained reverse osmosis filter system without regard to the first pressure.

3. The reverse osmosis filtration system of claim 2, wherein the second pressure is between 510 and 590 kPa.

4. The reverse osmosis filtration system of claim 2, wherein the storage tank having a burst pressure selected based on the second pressure.

5. The reverse osmosis filtration system of claim 4, wherein the raw water pressure regulator is spaced away from an axis of the storage tank so as to not interfere with the coupling of the storage tank to the lower side of the manifold assembly.

6. The reverse osmosis filtration system of claim 1, wherein the outlet of the raw water pressure regulator is coupled to the manifold assembly so that the raw water pressure regulator and the coupling to the manifold assembly are located entirely below the manifold assembly.

7. A method of assembling a reverse osmosis filtration system as a single self-contained assembly for counter top and under the counter use as in claim 1, the method comprising:
   providing a manifold assembly with a lower side to which parts of the reverse osmosis filter system are attached;
   coupling a raw water pressure regulator to the lower side of the manifold assembly such that the raw water pressure regulator is entirely within the self-contained assembly;
   coupling an inlet of the raw water pressure regulator to a source of raw water having a first pressure; and
   coupling an outlet of the raw water pressure regulator to the manifold assembly.

8. The method of claim 7, further comprising setting the raw water pressure regulator to a second pressure that maximizes the ratio of product water to waste water under normal operating conditions without clogging the self-contained reverse osmosis filter system without regard to the first pressure.

9. The method of claim 8, wherein the second pressure is between 510 and 590 kPa.

10. The method of claim 7, further comprising coupling a storage tank coupled to the lower side of the manifold assembly such that the storage tank is entirely within the self-contained assembly, the storage tank having a burst pressure selected based on the second pressure.

11. The method of claim 10, wherein the raw water pressure regulator is spaced away from an axis of the storage tank so as to not interfere with the coupling of the storage tank to the lower side of the manifold assembly.

12. The method of claim 7, wherein the outlet of the raw water pressure regulator is coupled to the manifold assembly so that the raw water pressure regulator and the coupling to the manifold assembly are located entirely below the manifold assembly.

* * * * *